Patented June 14, 1938

2,120,946

UNITED STATES PATENT OFFICE 2,120,946

PROCESS FOR THE PRODUCTION OF ZEIN

Lloyd C. Swallen, Pekin, Ill., assignor, by mesne assignments, to Corn Products Refining Company, New York, N. Y., a corporation of New Jersey No Drawing. Application May 8, 1935, Serial No. 20,403. Renewed December 10, 1937

6 Claims. (Cl. 87—28)

My invention relates to an improved process for obtaining solutions of zein from the mixed proteins of maize. More specifically, my invention relates to a process for obtaining relatively concentrated solutions of zein having reduced oil and color content and unaltered plasticity.

It is known that zein may be extracted from maize meal or from mixed maize proteins such as gluten meal by extraction with aqueous alcoholic solvents, and that the resulting extract may be purified by further extraction with oil and color solvents. An improved procedure of this nature is disclosed in my copending application Ser. No. 20,402, filed May 8, 1935. Such procedures, however, involve the use of considerable quantities of solvents and require evaporation of the original extract if relatively concentrated solutions are desired. I have now discovered an improved process using minimum quantities of solvents which yields relatively concentrated solutions without the necessity for intermediate evaporation. This process also has the advantage that both the extraction and purification steps are effected without necessity for conditions which would undesirably alter the plasticity of the zein. The zein is maintained in solution throughout the process and is not subjected to undue heating. The final product is unaltered in plasticity and is eminently suited for use in the production of protein plastics.

My process comprises, briefly, extracting the proteinaceous material with an aqueous alcoholic solvent mixture containing a substantial proportion of the color solvent to be subsequently used, and treating the resulting extract with further color solvent whereby the zein is separated in an alcoholic solution of increased concentration and oil and coloring matter are removed in the solvent layer. Lower aliphatic alcohols such as ethyl or methyl alcohol may be used as the main extractant for the first step and any alcohol-miscible solvent for maize oil and coloring matter, which is a non-solvent for zein, may be employed as the diluent in the first step and as the solvent in the second step. I have found that toluol is extremely satisfactory for this purpose, but various equivalents such as benzol, xylol, chlorinated hydrocarbons, and the like will readily suggest themselves to those skilled in the art. Unsubstituted aliphatic hydrocarbons may also be employed, but these are disadvantageous from the standpoint of color extraction and will necessitate an increased number of extractions for this purpose.

The preliminary extraction is effected by means of an aqueous solvent mixture containing from 5–10% of water and preferably from 7–8%. The ratio of alcohol to diluent employed will depend upon the "zein tolerance" of the particular diluent employed, i. e. upon the amount of diluent which may be added to the alcoholic zein solution before the mixture separates into two phases. This may readily be determined by a simple preliminary experiment. In the case of toluol, for example, a safe proportion is two parts of alcohol to one part of toluol. The amount of water which may be present in the solvent mixture will also depend upon the tolerance of the particular mixture. Thus, amounts of water up to 20% or more may be utilized if the desired zein tolerance of the particular mixture is not exceeded.

The extraction step may be carried out according to any known procedure, but if the zein is to be used for plastic purposes, I prefer to employ the process disclosed in my copending application Ser. No. 20,401, filed May 8, 1935. According to this process, the extraction was effected at temperatures below 70° C. and preferably from 55–65° C. and at hydrogen ion concentrations such that the pH of the final extract is above 6.0 and preferably falls within the range 6.0–7.0. Any suitable apparatus may be employed, as for example, a percolator, and the process may be carried out either by the batch method, the countercurrent method, or a combination of these two.

If it is desired to secure extremely concentrated solutions, the preliminary extract may be concentrated at this point by vacuum distillation or the like. However, this step is usually undesirable from the standpoint that ternary azeotropic mixtures are formed, and changes in the solvent balance will have to be compensated for in order to eliminate the danger of precipitating the zein and thus altering its plasticity. If care is taken in this regard, the solution may be concentrated to any desired extent, but I prefer in general to proceed directly to the second extraction without intermediate concentration. As will be seen below, relatively concentrated solutions are obtained by my process simply by the dual extraction under the conditions specified.

The solution obtained as described above is next treated with additional quantities of the original diluent which now serves as the solvent for maize oil and coloring matter. An amount of this solvent sufficient to exceed the zein tolerance is added, thus separating an alcoholic zein solution of increased concentration and removing oil and coloring matter in the solvent layer.

The solvent layer may readily be separated by the use of a siphon or simply by decanting. Further concentration of the zein solution and further extraction of oil and coloring matter may be obtained by repeating this process.

After the final extraction with the color solvent and the separation of the solvent layer, zein is obtained in a relatively concentrated solution suitable for treatment to obtain the zein in a solid state. The material will be found to have unaltered plasticity and to have an oil and color content sufficiently reduced to be suitable for use in the preparation of plastics. It will be seen that this process involves the minimum number of steps necessary to extract and purify zein. Likewise, it employs substantially less total solvents than any prior process for this purpose. The steps of the process are extremely simple to carry out and may be effected in any suitable inexpensive apparatus. Further advantages of my process will be apparent from the following example:

Example 100 lbs. of gluten meal ground to pass an 8 mesh screen but not a 20 mesh screen were mixed with 26 gallons of 93% ethyl alcohol and 13 gallons of toluol, containing 2 liters of 6.5 N sodium hydroxide. The solvent mixture was heated before mixing with the gluten meal so that after mixing the temperature was approximately 60° C. The material was gently agitated for approximately 2 hours in a suitable vessel, after which the extract was decanted. The hydrogen ion concentration at the beginning of the extraction was approximately pH 8.0 and at the end of the extraction ph 6.5. 13 gallons of toluol were then added to the extract and the mixture was thoroughly agitated and then allowed to settle. A concentrated alcoholic solution of zein separated out, from which the supernatant solvent layer, containing a substantial amount of the oil and coloring matter of the original extract, was then decanted. The zein solution was extracted twice more with 13 gallon portions of toluol, securing further concentration of the zein and removing substantially all of the remaining oil and coloring matter. The resulting zein solution had a zein content of approximately 4 lbs. per gallon. After recovery in solid form, the zein was found to have unaltered plasticity and to have a satisfactory light color and low oil content. When made into a plastic, the resulting product was found to be a clear light-colored hard material having satisfactory toughness and elasticity and a transverse strength of the order of 10,000 lbs. per square inch.

The reduction in the necessary amount of solvents secured by my process may readily be seen if the above example is compared with the same process carried out with pure aqueous alcohol as the original extract. In the present case, it is seen that a total volume of 52 gallons of solvents was required to effect both the preliminary extraction and the subsequent separation of the concentrated zein solution. If aqueous alcohol was used, on the other hand, it would require 39 gallons of alcohol for the preliminary extraction and approximately 39 gallons of toluol for the subsequent separation, or a total of 78 gallons. It is thus seen that my present process effects a saving of approximately one-third in the amount of solvents to be handled and has the further advantage that a more concentrated solution of zein is secured.

It will be understood, of course, that in commercial operation of the above example, the original extraction would be followed by subsequent extractions or washings, utilizing the resulting solutions for preliminary extraction of subsequent batches; or the extractions could be carried out according to a strictly countercurrent method. Such procedures would increase the yield and would decrease the amount of solvents required for the final color extraction. This example is illustrative only, and is not to be construed as limiting, in any way, the scope of my invention. Various equivalent solvent combinations could be employed with equal success and the extraction steps could be carried out in any known manner and in any suitable apparatus. In general, it may be said that any equivalents or any modifications of procedure which would naturally occur to one skilled in the art may be employed without departing from the scope of my invention.

My invention now having been described, what I claim is:

1. A process for obtaining zein in concentrated solution, having unaltered plasticity and reduced oil content, which comprises subjecting zein-containing proteinaceous material to extraction with a homogeneous solvent mixture containing a major portion of alcohol, a minor portion of an auxiliary solvent comprising an alcohol-miscible organic solvent for maize oil and coloring matter which is a non-solvent for zein, and from 5-20% of water, treating the resulting extract with an additional portion of said auxiliary solvent, whereby the zein is separated in an alcoholic solution of increased concentration and oil and coloring matter are removed in a supernatant solvent layer, and finally separating the resulting zein solution from said solvent layer.

2. A process for obtaining zein in concentrated solution, having unaltered plasticity and reduced oil content, which comprises subjecting zein-containing proteinaceous material to extraction with a homogeneous solvent mixture containing a major portion of alcohol, a minor portion of an aromatic hydrocarbon, and from 5-10% of water, treating the resulting extract with an additional portion of said aromatic hydrocarbon, whereby the zein is separated in an alcoholic solution of increased concentration and oil and coloring matter are removed in a supernatant solvent layer, and finally separating the resulting zein solution from said solvent layer.

3. A process for obtaining zein in concentrated solution, having unaltered plasticity and reduced oil content, which comprises subjecting zein-containing proteinaceous material to extraction with a homogeneous solvent mixture containing a major portion of alcohol, a minor portion of toluol, and from 5-10% of water, treating the resulting extract with an additional portion of toluol, whereby the zein is separated in an alcoholic solution of increased concentration and oil and coloring matter are removed in a supernatant solvent layer, and finally separating the resulting zein solution from said solvent layer.

4. A process for obtaining zein in concentrated solution, having unaltered plasticity and reduced oil content, which comprises subjecting zein-containing proteinaceous material to extraction with a homogeneous solvent mixture containing a major portion of alcohol, a minor portion of an auxiliary solvent comprising an alcohol-miscible organic solvent for maize oil and coloring matter which is a non-solvent for zein, and from 7-8% of water, treating the resulting extract with an additional portion of said auxiliary solvent, whereby the zein is separated in an alcoholic solution of increased concentration and oil and coloring matter are removed in a supernatant solvent layer, and finally separating the resulting zein solution from said solvent layer.

5. A process for obtaining zein in concentrated solution, having unaltered plasticity and reduced oil content, which comprises subjecting zein-containing proteinaceous material to extraction with a homogeneous solvent mixture containing a major portion of alcohol, a minor portion of an aromatic hydrocarbon, and from 7-8% of water, treating the resulting extract with an additional portion of said aromatic hydrocarbon, whereby the zein is separated in an alcoholic solution of increased concentration and oil and coloring matter are removed in a supernatant solvent layer, and finally separating the resulting zein solution from said solvent layer.

6. A process for obtaining zein in concentrated solution, having unaltered plasticity and reduced oil content, which comprises subjecting zein-containing proteinaceous material to extraction with a homogeneous solvent mixture containing a major portion of alcohol, a minor portion of toluol, and from 7-8% of water, treating the resulting extract with an additional portion of toluol, whereby the zein is separated in an alcoholic solution of increased concentration and oil and coloring matter are removed in a supernatant solvent layer, and finally separating the resulting zein solution from said solvent layer.

LLOYD C. SWALLEN.